(12) United States Patent
Eiselt et al.

(10) Patent No.: US 9,112,617 B2
(45) Date of Patent: Aug. 18, 2015

(54) METHOD AND DEVICE FOR MONITORING A DETACHABLE FIBER-OPTIC CONNECTION, ESPECIALLY IN A FIBER-OPTIC TRANSMISSION DEVICE OR SYSTEM

(75) Inventors: Michael Eiselt, Kirchheim (DE); Wesley Doonan, Fairfax, VA (US)

(73) Assignee: ADVA Optical Networking SE, Meiningen (DE)

( * ) Notice: Subject to any disclaimer, the term of this patent is extended or adjusted under 35 U.S.C. 154(b) by 36 days.

(21) Appl. No.: 13/291,163

(22) Filed: Nov. 8, 2011

(65) Prior Publication Data
US 2012/0148233 A1 Jun. 14, 2012

(30) Foreign Application Priority Data

Dec. 13, 2010 (EP) ..................... 10401216

(51) Int. Cl.
*H04B 10/00* (2013.01)
*H04B 10/85* (2013.01)
*H04J 14/02* (2006.01)

(52) U.S. Cl.
CPC ............. *H04B 10/85* (2013.01); *H04J 14/0201* (2013.01); *H04J 14/0221* (2013.01)

(58) Field of Classification Search
USPC ...................................... 398/17–21
See application file for complete search history.

(56) References Cited

U.S. PATENT DOCUMENTS

| | | | |
|---|---|---|---|
| 4,217,488 A * | 8/1980 | Hubbard | 398/40 |
| 4,762,992 A * | 8/1988 | Gat et al. | 250/208.2 |
| 6,002,501 A * | 12/1999 | Smith et al. | 398/9 |
| 6,507,012 B1 | 1/2003 | Medard et al. | |
| 6,630,992 B1 * | 10/2003 | Vobian et al. | 356/73.1 |
| 7,697,845 B2 * | 4/2010 | Uchiyama et al. | 398/83 |
| 7,755,027 B2 * | 7/2010 | Browning et al. | 250/227.14 |
| 8,218,966 B2 * | 7/2012 | Gutin et al. | 398/40 |
| 2004/0247316 A1 | 12/2004 | Soto et al. | |

(Continued)

FOREIGN PATENT DOCUMENTS

WO    WO 97/23965 A1    7/1997
WO    WO 2006/074534 A1    7/2006

OTHER PUBLICATIONS

EPO, Extended European Search Report issued May 26, 2011 in corresponding European patent application No. 10401216 (8 pages).

(Continued)

*Primary Examiner* — Agustin Bello
(74) *Attorney, Agent, or Firm* — The Culbertson Group, P.C.

(57) ABSTRACT

The invention relates to a method for monitoring a detachable fiber-optic connection, especially in a fiber-optic transmission device or system, comprising the steps of transmitting a wanted optical transmission signal carrying information data to be transmitted to at least one fiber-optic connection, a predetermined portion of the power of said optical transmission signal being reflected at the at least one fiber-optic connection depending on the status and properties of the at least one fiber-optic connection, creating a detection signal by detecting said reflected predetermined portion of the power of said optical transmission signal, monitoring and evaluating the detection signal as a function of time and creating a "DETECT" signal if the detection signal or a signal derived from the detection signal reveals a characteristic change in its course in time. Further, the invention relates to a corresponding device adapted to realize this method.

19 Claims, 3 Drawing Sheets

(56) References Cited

U.S. PATENT DOCUMENTS

| | | | |
|---|---|---|---|
| 2007/0071229 A1* | 3/2007 | Kozek et al. | 379/399.01 |
| 2008/0044179 A1* | 2/2008 | Karpati | 398/20 |
| 2009/0016714 A1* | 1/2009 | Soto et al. | 398/20 |
| 2009/0257743 A1* | 10/2009 | Chung et al. | 398/21 |
| 2010/0172644 A1* | 7/2010 | Uchiyama et al. | 398/7 |
| 2011/0241881 A1* | 10/2011 | Badinelli | 340/541 |
| 2012/0148233 A1* | 6/2012 | Eiselt et al. | 398/28 |

OTHER PUBLICATIONS

Hofmann et al., "End Face Coupling as Detachable Connection of Dielectric Waveguides at 75 GHz and 300 GHz," 2004 Joint 29th Int. Conf. of Infrared and Millimeter Waves and 12th Int. Conf. on Terahertz Electronics, IEEE, Sep. 27, 2004, pp. 763-764, XP010795214 (2 pages).

* cited by examiner

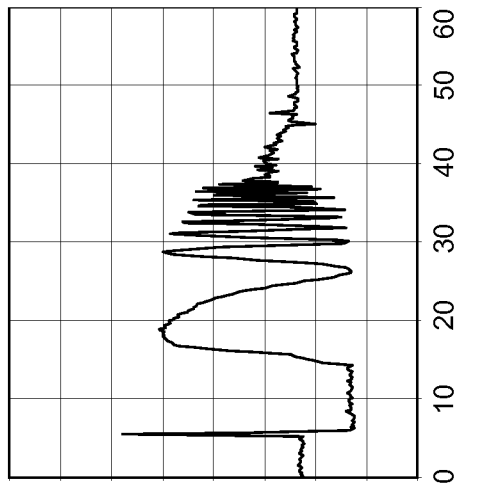
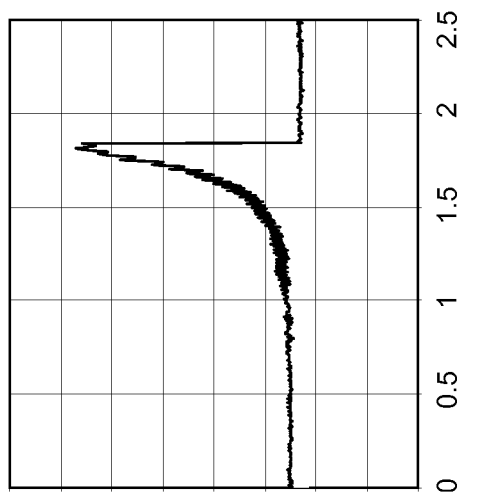
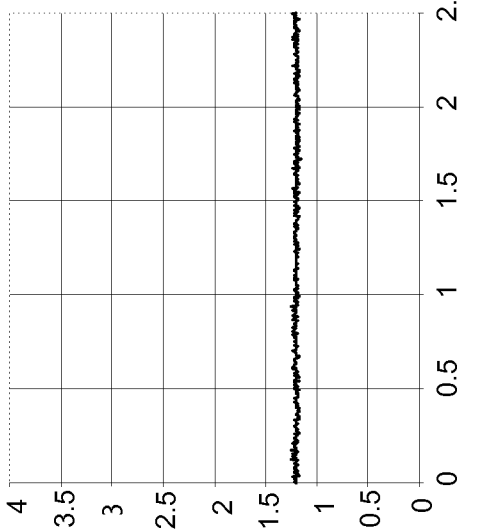
Fig. 5a
Fig. 5b
Fig. 5c

METHOD AND DEVICE FOR MONITORING A DETACHABLE FIBER-OPTIC CONNECTION, ESPECIALLY IN A FIBER-OPTIC TRANSMISSION DEVICE OR SYSTEM

TECHNICAL FIELD OF THE INVENTION

The present invention relates to methods and devices for monitoring a detachable fiber-optic connection, especially in a fiber-optic transmission device or system.

BACKGROUND OF THE INVENTION

In an optical communication system, terminal channel cards are usually located at secure locations, providing sufficient security to prevent tampering and wire tapping. However, as optical amplification and cross-connection are required in optical networks, there are several locations outside the terminal building, where access to the optical signal can be obtained without much effort and without interrupting the optical fiber. Especially, in optical amplifiers a monitor port allows access to the full spectrum of a WDM signal with sufficient power to detect the signal error free. In this case, only a readily available optical filter is required to separate the WDM channel of interest from the other channels of a WDM system.

In some implementations of an R-OADM (reconfigurable optical add-drop multiplexer) node, even output connectors are available that allow access to single channels of a WDM system. While it is desirable to maintain these optical ports available for service personnel to connect measurement equipment (power meter, optical spectrum analyzer) for maintenance tasks, it is undesirable that any of these ports can be used, undetected by the owner or operator of the transmission system, to wiretap the optical signal.

SUMMARY OF THE INVENTION

It is an object of the present invention to provide a method and a device for monitoring a detachable fiber-optic connection, especially in a fiber-optic transmission device or system, enabling to detect if an optical waveguide or fiber (in the following the term "fiber" is used in its broadest sense including arbitrary optical waveguides) is being connected to an open output port or if a connected fiber is detached from an optical connection of an optical transmission device or system.

The invention is generally based on the finding that at an open fiber end, part of the optical power of a wanted optical transmission signal leaving the fiber is reflected and coupled back into the fiber, resulting in a return loss (ratio of forward power to reflected power of about 25 or 14 dB). Connecting another fiber to the open fiber end will at least lead to a short-term change in the return loss of the connector surface due to the transitional formation of resonance cavities. The same occurs when a previously connected fiber is disconnected. This change in return loss can be observed upstream of the connector as a change in optical reflected power. The characteristic transitional change in power is an indication that a fiber has been connected to or disconnected from the open connector.

If such a connection or disconnection is detected, measures can be taken to either get an authentication from the person connecting to the system or disconnecting from the system, to dispatch security personnel, or to switch the tapped connection to a different (protection) path. All these activities can be initiated via an additional communication network.

According to a preferred embodiment of the invention, the detection signal is an electrical detection signal obtained by converting the reflected predetermined portion of the power of the optical transmission signal into an electrical signal, the electrical detection signal preferably being acted upon by a filter function, especially a low-pass filter function, during the conversion or during a subsequent filtering process. A low-pass filter can also be realized by the transfer function of a corresponding slow photodiode.

According to an embodiment of the invention, the characteristic change is detected by comparing the course of the time-dependent detection signal to a predetermined, preferably stored pattern or by comparing values of the detection signal or the signal derived therefrom to predetermined threshold values or by determining the slope of the time-dependent detection signal or the signal derived therefrom and comparing determined slope values to predetermined threshold values. A stored pattern (e.g. in form of discrete values covering a predetermined time interval) may be compared with the actual course of the function representing the detection signal by calculating the cross correlation and comparing the calculated cross correlation values to a given threshold value.

A further, simpler method is to compare at least one up-to-date sampled value or an up-to-date average value of more sampled values of the detection signal to a previously sampled initial value or to a previously taken initial average value of more sampled values, the "DETECT" signal being created if the up-to-date sampled value or the up-to-date average value differs by more than a predetermined threshold value from the previously sampled value or from the previously determined average of sampled values.

The previously sampled initial value or previously determined initial average of sampled values may be determined during a steady state of the detection signal. Thus, by comparing subsequently sample values of the detection signal to the initial value or average, at least a transient change in the detection signal can be detected. Averaging the subsequently sampled values in the sense of a moving mean can be additionally used in order to realize a digital low-pass filter. For example, a "DETECT" signal may be created when a given number (including one) of subsequently sampled values or average values exceed or fall below corresponding given threshold values.

As an alternative, a previously sampled initial value or a previously determined initial average of sampled values may continuously be determined in predetermined time intervals and be continuously compared to a respective subsequently sampled up-to-date value or a respective subsequently determined up-to-date average value of sampled values. In this way, the slope of the course of the detection signal or filtered detection signal (in case of using a moving mean) can be evaluated and compared to a predetermined condition. In this case, a "DETECT" signal may by way of example be created when, for more than once or a given number of times, the difference between two subsequently sampled values or two subsequent average values exceeds or falls below given threshold values. Of course, for all these alternatives, the sampling rate must be determined such that during, the time interval covered by a characteristic change in the detection signal to be detected, a sufficient number of sampled values can be obtained.

According to a further embodiment of the invention, during a steady state of the detection signal and before creating a "DETECT" signal, a sampled value or previously determined average of sampled values of the detection signal may be determined as an initial steady state value and after having created a "DETECT" signal, a further up-to-date sampled value or a further up-to-date average value may be determined during a subsequent steady state of the detection signal as up-to-date steady state value. A "PLUG-IN" signal may in this case be created if the up-to-date steady state value is lower than the initial steady state value and/or a "PLUG-OUT" signal may be created if the up-to-date steady state value is higher than the initial steady state value.

The device according to the invention comprises an optical splitter means provided within the optical path of the wanted optical transmission signal carrying information data to be transmitted to the at least one fiber-optic connection to be monitored. The optical splitter means is adapted to couple at least a predetermined portion of the optical power of the reflection signal from said optical path into an optical monitoring path.

The device further comprises a detection and evaluation means for receiving as optical detection signal the predetermined portion of the reflection signal coupled into the optical monitoring path. The detection and evaluation means may be realized as a programmable controller unit comprising an optical receiver for converting the optical detection signal into an electrical detection signal. The sampling and evaluating of the detection signal as well as the creating of the "DETECT" signal and "PLUG-IN" and "PLUG-OUT" signal may be effected under control of a suitable software.

The optical splitter means may be realized as an optical 1×2 coupler or an optical circulator, a first port of which is connected to a respective end of an incoming optical waveguide guiding the wanted optical transmission signal towards the at least one optical connection, a second port of which is coupled to an outgoing optical waveguide guiding the wanted optical transmission signal towards the at least one optical connection and receiving the reflection signal, and a third port of which is connected to an optical monitoring waveguide guiding the detection signal towards the detection and evaluation means.

According to the invention, the wanted optical transmission signal may be an optical WDM signal, the optical splitter means being provided within the optical path connected to a WDM input port of an optical demultiplexing device in order to monitor one or more fiber-optic connections each provided within an optical path connected to one of a predetermined number of demultiplex output ports of the demultiplexing device. In this way, by using a single monitoring device according to the invention, several connections provided downstream the demultiplexing device can be monitored.

The detection and evaluation means may further be adapted to receive an information signal in case the optical power of the wanted optical transmission signal is changed at a predetermined time or in case an admissible change of the status of the optical connection to be monitored is effected at a predetermined time. The detection and evaluation means may take into account this information when creating the "DETECT" signal. For example, the detection and evaluation means may suppress creating a "DETECT" signal if it is informed of an increase or decrease in the optical power of the wanted transmission signal being a WDM signal due to an increase or decrease in the number of WDM channels included in the WDM signal. Also, creating of a "DETECT" signal may be suppressed in case the detection and evaluation means is informed in advance of an admissible change of the status of the connection due to an admissible plug-in or plug-out operation.

These and other advantages and features of the invention will be apparent from the following description of illustrative embodiments, considered along with the accompanying drawings.

BRIEF DESCRIPTION OF THE DRAWINGS

The invention will be described in more detail below on the basis of the embodiments shown in the figures of the drawing. In the drawing:

FIG. 5a shows a measured example curve of the detection signal evaluated by a device according to the invention in the case of a steady state;

FIG. 5b shows a measured example curve of the detection signal evaluated by a device according to the invention in the case of connecting a waveguide to an open connection; and FIG. 5c shows a measured example curve of the detection signal evaluated by a device according to the invention in the case of disconnecting a waveguide from a closed connection.

DESCRIPTION OF ILLUSTRATIVE EMBODIMENTS

Figure 1:
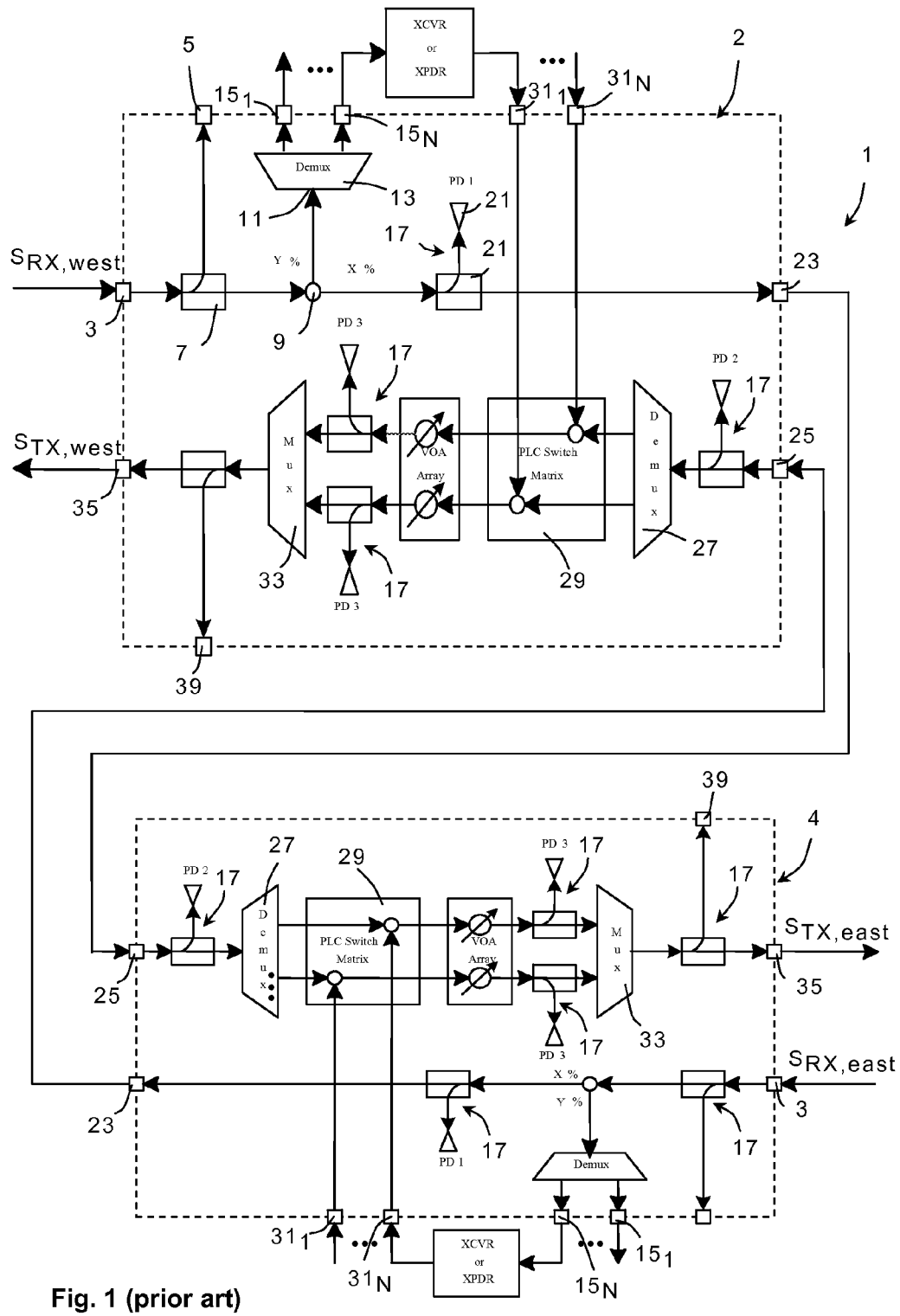
FIG. 1 shows a schematic block diagram of a known R-OADM (reconfigurable optical add-drop multiplexer) to which, by way of example, the invention may be applied.

The R-OADM 1 shown in the schematic block diagram according to FIG. 1 is part of a fiber-optic WDM data transmission system (not shown in further detail). The R-OADM 1 comprises two essentially identical port units 2, 4. At the western port unit 2 an optical WDM signal $S_{RX,west}$ is received at a western WDM receiving port 3. The received WDM signal $S_{RX,west}$ can be monitored at a monitoring port 5 consisting of an open fiber-optic connector, e.g. a fiber-optic MU connector, or any other type of detachable fiber-optic connection. The WDM monitoring signal is branched off from the received WDM signal $S_{RX,west}$ by means of an optical 1×2 splitter 7. In case the received WDM signal $S_{RX,west}$ shall be monitored, an external monitoring equipment (not shown) is coupled to the monitoring port 5 using a fiber-optic connector. As this monitoring port is open during normal operation of the R-OADM, it is desirable to assure that only admissible connections are established or, in other words, inadmissible connections to the open port 5 should be detected.

In order to demultiplex and locally drop specified optical channel signals included in the WDM signal $S_{RX,west}$, a further optical 1×2 splitter 9 having a desired split ratio is used. A specified portion Y of the optical power of the WDM signal $S_{RX,west}$ is directed to the WDM input port 11 of an optical demultiplexer 13 which demultiplexes the received signal $S_{RX,west}$ into N single channel signals included within the WDM signal $S_{RX,west}$ and outputs the channel signals at western channel output ports $15_{1,west}$ to $15_{N,west}$. Of course, as the case may be, one or more of the channel signals may be replaced by channel group signals, each including more than one optical channel, depending on the demultiplexing properties of the optical demultiplexer 13. Depending on the actual configuration of the R-OADM one or more of the channel output ports $15_{1,west}$ to $15_{N,west}$ may remain open. Thus, it is also desirable to detect inadmissible connections to such open channel ports.

The WDM signal $S_{RX,west}$ is then fed to an internal monitoring device 17 comprising a further optical 1×2 splitter 19 again branching off a specified power portion of the signal $S_{RX,west}$ for internal monitoring purposes, the branched-off signal being converted into an electrical signal by a photodiode 21 and fed to an evaluation unit (not shown).

Subsequently, the remaining power portion of the received WDM signal $S_{RX,west}$ is fed to the internal receiving port 23 of the western port unit 2 that is connected to the internal transmitting port 25 of the eastern port unit 4. Within the port unit 4, the WDM signal $S_{RX,west}$ is again fed to an internal monitoring device 17 as described above. Then, the WDM signal $S_{RX,west}$ is demultiplexed by means of an optical demultiplexer 27 into the single channel (or group channel) signals that are fed to an optical switch matrix 29 enabling the integration of locally added optical channel signals (or looped-back optical channel signals included in an optical WDM signal $S_{RX,east}$ received at an eastern WDM receiving port 3 of the eastern port unit 4) provided at western channel add ports $31_1$ to $31_N$. In each of the channel paths a variable optical attenuator (VOA) and a further internal monitoring device 17 are provided in order to equalize the power of the channel signals which are then multiplexed by means of an optical multiplexer 33 into an eastern optical WDM transmitting signal $S_{TX,east}$. The WDM signal $S_{TX,east}$ is again fed via an internal monitoring device 17 to an eastern WDM transmitting port 35. The power portion of the signal $S_{TX,east}$, branched-off by the internal monitoring device 17 is fed to a further monitoring port 39 at which the signal can be monitored by means of an external monitoring equipment (as explained above in connection with the monitoring port 5).

With respect to receiving a WDM signal $S_{RX,east}$ at the eastern WDM receiving port 3 of the eastern port unit 4 and forming a WDM transmitting signal $S_{TX,west}$ which is transmitted at the western transmitting port 35 of the western port unit 2, the above explanations apply correspondingly as the port units 2, 4 reveal an essentially identical structure and are connected laterally reversed.

As is apparent from the above description of a known R-OADM 1, there are several possibilities for intentionally tapping signals at externally accessible ports which remain open during normal operation of the R-OADM. Such ports may be monitored using the monitoring method and monitoring device according to the invention described below with reference to FIGS. 2 to 5.

Figure 2:
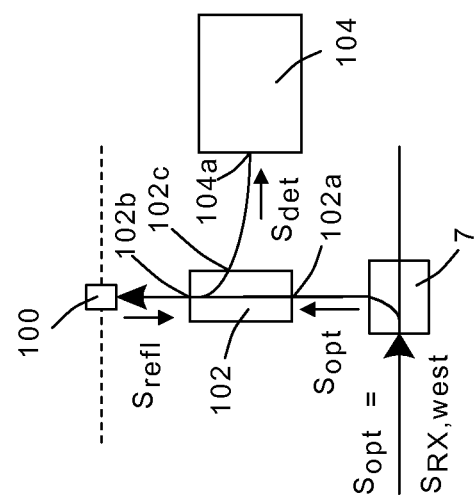
FIG. 2 shows a schematic block diagram of a first embodiment of a device according to the present invention used for monitoring an open connector.

FIG. 2 shows a first embodiment of a device according to the invention for monitoring a detachable fiber-optic 100 connection with respect to inadmissible changes of the open or closed status of the connection 100, which may be an externally accessible port. FIG. 2 shows the situation and structure of the R-OADM according to FIG. 1 in the neighborhood of the external monitoring port 5 of the R-OADM of FIG. 1. However, for the following general explanations new reference signs are used for the port 5 and the optical splitter 7.

To detect an optical waveguide to be connected to the open waveguide or port 100, an optical 1×2 monitoring splitter or coupler 102 is provided in the optical path before the fiber-optic connection 100. A portion of an optical signal $S_{opt}$ (which might be the WDM signal $S_{RX,west}$) is branched off from a main optical path and fed to a first port 102a of the 1×2 monitoring splitter 102. For simplicity reasons, this branched-off signal is also referred to as signal $S_{opt}$ as this is the signal actually to be monitored. At the fiber-optic connection 100, a predetermined portion of the power of the optical signal $S_{opt}$ is reflected depending on the status (open/closed) of the connection 100 and depending on the properties of the optical waveguides (i.e. the optical waveguide defining the port and in the closed status of the connection the optical waveguide coupled thereto) and its surfaces. The reflected monitoring signal $S_{refl}$ is fed back to the second port 102b of the 1×2 splitter 102 that is coupled to the fiber-optic connection 100. A predefined portion of the monitoring signal $S_{refl}$ is output as optical detection signal $S_{det}$ at the third port 102c of the 1×2 splitter 102 and guided to an input port 104a of a detection and evaluation device or unit 104. The splitting or coupling ratio of the 1×2 splitter 102 should be chosen such that the insertion loss is minimized for the main signal $S_{opt}$, but still sufficient reflected power in form of the signal $S_{det}$ is coupled to the detection and evaluation unit 104. The recommended coupling ratio is therefore between 80:20 and 98:2.

Of course, the detection and evaluation unit 104 may comprise a converter for converting the optical detection signal $S_{det}$ into an electrical detection signal. Further, the electrical detection signal may be sampled in predetermined time intervals, preferably with a constant sampling rate, and converted into a digital signal for further digital processing and evaluation.

The opto-electric converter may e.g. be a rather slow photodiode additionally realizing a low-pass filter function as the detection does not aim at an evaluation of the information data contained in the detected signal, but at an evaluation of the average optical power of the signal $S_{refl}$ reflected at the fiber-optic connection 100.

The detection and evaluation unit 104 is adapted to detect and evaluate power transitions in the detected optical signal $S_{det}$. In case the detection and evaluation unit 104 detects a power transition, especially a power transition that is interpreted as an inadmissible change of the status of the fiber-optic connection 100, it creates a "DETECT" signal which may be forwarded to a management system. Of course, the detection and evaluation unit 104 may also be adapted to directly create an alarm signal or a signal to call maintenance personnel.

FIG. 5 shows the measured reflected power from the open fiber-optic connection 100 realized by a fiber-optic connector (especially an MU-connector) in a steady state of the open connection (FIG. 5a), during connection of a jumper cable with an open opposite end (FIG. 5b) and during disconnection of the jumper cable from the connector. It can be seen that during connection as well as during disconnection the reflected power drastically increases by at least a twofold to threefold value. Depending on how fast the connecting or disconnecting of the jumper cable is effected, the broadness of the power transition measured may vary to a large extent (see the different time scales in FIGS. 5b and 5c).

Such characteristic power transitions can be detected by applying rather simple evaluation methods. For example, a sliding average may be used where the up-to-date (i.e. the newest) average value is compared to a steady state (average) value taken during an earlier steady state phase and where a "DETECT" signal is created if at least one up-to-date average value exceeds of falls below a predefined maximum or minimum threshold value, respectively. In order to exclude single non-characteristic transitions, a "DETECT" signal may be created only in case a certain number of subsequently taken average values (or a minimum number of average values in a given time interval or in a series of a given number of average values) exceed or fall below a corresponding threshold value, i.e. the "DETECT" signal is created only if the transition covers a minimum time interval. Of course, the same method may be applied using single sampled values of the detection signal $S_{det}$ instead of average values.

As a further simple alternative, the slope of the detection signal $S_{det}$ may be evaluated in order to detect transitions in the signal. For example, the difference (or absolute value of the difference) of two subsequent single or average values may be compared and a "DETECT" signal may be created in case two one or more subsequent differences (or absolute values thereof) exceed a given threshold value.

Of course, also other and more sophisticated (and, as the case may be, more computationally intensive) methods may be used in order to determine (inadmissible) transients in the detection signal $S_{det}$. For example, a cross-correlation method may be applied in order to compare a given (e.g. stored) transition with a given form to the course of the detection signal $S_{det}$ and create a "DETECT" signal in case a given threshold value for the cross-correlation function is exceeded.

Figure 4:
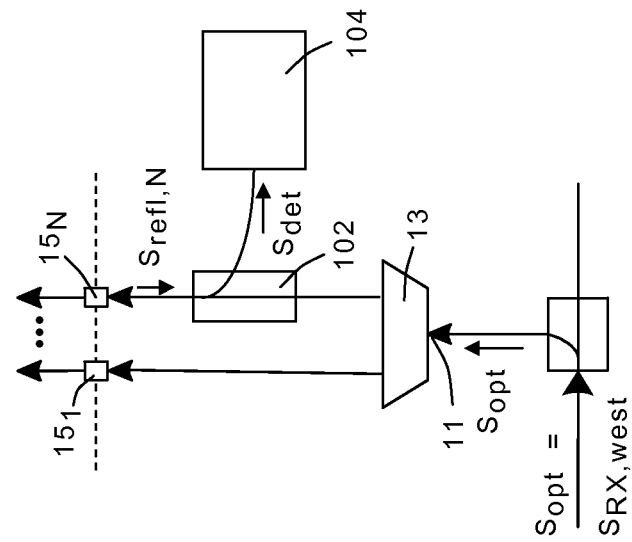
FIG. 4 shows a schematic block diagram of a third embodiment of a device according to the present invention used for monitoring a single open connector connected to a specific channel output port of an optical demultiplexer.
Figure 3:
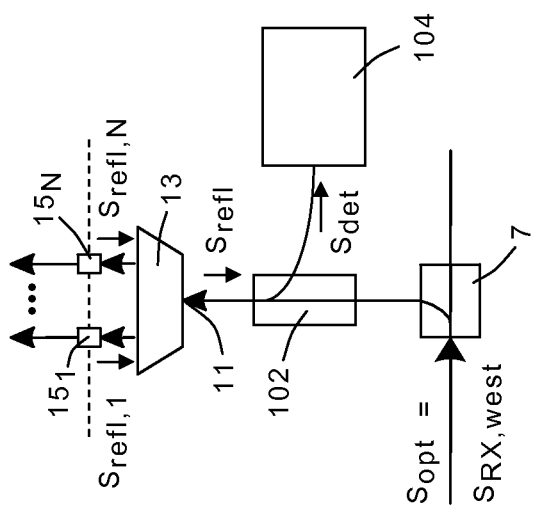
FIG. 3 shows a schematic block diagram of a second embodiment of a device according to the present invention used for monitoring all open connectors connected to channel output ports of an optical demultiplexer.

While FIG. 2 applies a structure in which a signal fed to an accessible port is directly monitored in its optical path, FIGS. 3 and 4 show structures as included in the R-OADM according to FIG. 1 in the region of the channel ports $15_1$ to $15_N$ including two different alternatives for using the method and device according to the present invention.

In FIG. 3 the signal reflected at one or more or all specific ports $15_1$ to $15_N$ (if at more or all ports reflection actually occurs) is monitored by detecting the (multiplexed) reflected signals before the WDM input port 11 of an optical demultiplexer 13. Here, without additional measures it is impossible to distinguish at which port a transient signal is caused due to a change of the port status (connection or disconnection of an optical waveguide). However, this method allows to monitor all channel ports simultaneously with a single detection and evaluation device.

In an alternative according to FIG. 4, a 1×2 monitoring splitter 102 can be located in the optical channel path between the channel output ports of the demultiplexer 13 and the respective channel port $15_1$ to $15_N$. Of course, also in two or more (or all) optical paths between the channel ports $15_1$ to $15_N$ a 1×2 monitoring splitter 102 may be provided. The detection signals can either be monitored by a single detection and evaluation unit (having a corresponding number of opto-electric converters) or by a corresponding number of detection and evaluation units.

In all these alternatives the invention enables the detection of changes in the status of a fiber-optic connection whether admissible or inadmissible.

As certain changes in an optical transmission system, e.g. changes of the optical power of a channel signal or adding or dropping one or more channels to or from an optical WDM signal, may occur without indicating an inadmissible status, the detection and evaluation unit may receive an information signal $S_{inf}$ containing such information. Thus, the detection and evaluation unit may take into account such information when creating the "DETECT" signal. For example, the detection and evaluation unit may detect a step in the power of the detection signal which, however, does not have the peak-like form of a transient as shown in FIG. 5. If the detection and evaluation unit is informed of such an admissible change of the system, it may exclude a corresponding situation detected in the detection signal from creating a "DETECT" signal. Alternatively or additionally, the evaluation algorithm may be chosen such that step-like alterations of the power of the detection signal are not recognized as inadmissible change of the status of the one or more connections to be monitored.

Of course, the information signal $S_{inf}$ may also include information that a specific monitored connection may be admissibly accessed during a certain time interval so that the detection and evaluation unit does not create a "DETECT" signal if actually a "DETECT" situation is detected during this time interval.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

1 R-OADM
2 western port unit
3 western/eastern WDM receiving port
4 eastern port unit
5 monitoring port (for WDM signal $S_{RX,east}$ and $S_{RX,west}$)
7 optical 1×2 splitter
9 optical 1×2 splitter
11 WDM input port
13 optical demultiplexer
$15_{1,west}$ channel output ports (i=1 ... N)
17 internal monitoring device
19 optical 1×2 splitter
21 photodiode
23 internal receiving port
25 internal transmitting port
27 optical demultiplexer
29 optical switch matrix
31 western channel add ports
33 optical multiplexer
35 eastern/western WDM transmitting port
39 monitoring port (for WDM signal $S_{TX,east}$ and $S_{TX,west}$)
100 fiber-optic connection
102 1×2 splitter
102a first port of 102
102b second port of 102
102c third port of 102
104 detection and evaluation device or unit

The invention claimed is:

1. A method for monitoring a detachable fiber-optic connection, the method comprising the steps of:
  (a) directing an optical transmission signal through one or more optical waveguides, each respective optical waveguide including a respective fiber-optic connection, and the optical transmission signal carrying information data to be received at a respective receiving device connectable to the respective optical waveguide through the respective fiber-optic connection, each respective fiber-optic connection reflecting a portion of the power of the optical transmission signal, the reflected portion of the power of the optical transmission signal depending on the status and properties of that respective fiber-optic connection, (b) creating a detection signal by detecting the reflected portion of the power of the optical transmission signal, (c) monitoring and evaluating the detection signal as a function of time, and (d) creating a "DETECT" signal if, irrespective of the power of the optical transmission signal, the detection signal or a signal derived from the detection signal reveals a characteristic change in course over time, the characteristic change in course over time being indicative of connecting or disconnecting a respective one or more of the fiber-optic connections.

2. The method according to claim 1, wherein said detection signal is an electrical detection signal obtained by converting the reflected portion of the power of the optical transmission signal into an electrical signal, the electrical detection signal being acted upon by a low-pass filter function during the conversion or during a subsequent filtering process.

3. The method according to claim 1 or 2, wherein the characteristic change is detected by comparing the course of the detection signal to a predetermined pattern.

4. The method according to claim 2, wherein at least one up-to-date sampled value or an up-to-date average value of more sampled values of the detection signal is compared to a previously sampled initial value or a previously taken initial average value of more sampled values, the "DETECT" signal being created if the up-to-date sampled value or the up-to-date average value differs by more than a predetermined threshold value from the previously sampled value or from the previously determined average of sampled values.

5. The method according to claim 4, wherein the previously sampled initial value or previously taken initial average value of sampled values is determined during a steady state of the detection signal.

6. The method according to claim 4, wherein a previously sampled initial value or a previously taken initial average value of sampled values is continuously determined in predetermined time intervals and continuously compared to a respective subsequently sampled up-to-date value or a respective subsequently determined up-to-date average value of sampled values.

7. The method according to claim 1 wherein during a steady state of the detection signal and before creating the "DETECT" signal, a sampled value or previously determined average of sampled values of the detection signal is determined as an initial steady state value and wherein after having created the "DETECT" signal, a further up-to-date sampled value or a further up-to-date average value is determined during a subsequent steady state of the detection signal as an up-to-date steady state value and wherein a "PLUG-IN" signal is created if the up-to-date steady state value is lower than the initial steady state value or wherein a "PLUG-OUT" signal is created if the up-to-date steady state value is higher than the initial steady state value.

8. A device for monitoring a detachable fiber-optic connection, the device comprising:

(a) an optical splitter provided within the optical path of an optical transmission signal such that at least a portion of the optical transmission signal is directed in a transmission direction from the optical splitter though an optical waveguide leading to a respective fiber-optic connection in the optical waveguide, the portion of the optical transmission signal directed through the optical waveguide carrying information data to be received at a receiving device connectable to the optical waveguide through the fiber-optic connection therein, the optical splitter being adapted to couple from the optical path into an optical monitoring path at least a predetermined portion of the optical power of a reflection signal resulting from a reflection of a portion of the power of the optical transmission signal at the fiber-optic connection, the reflected portion of the power of the optical transmission signal depending on the status and properties of the fiber-optic connection, and (b) detection and evaluation means receiving as a detection signal the predetermined portion of the optical power of the reflection signal coupled into the optical monitoring path, the detection and evaluation means being adapted to (i) monitor and evaluate the detection signal as a function of time, and to (ii) create a "DETECT" signal if, irrespective of the power of the optical transmission signal, the detection signal or a signal derived from the detection signal reveals a characteristic change in course over time, the characteristic change in course over time being indicative of connecting or disconnecting the fiber optic connection.

9. The monitoring device according to claim 8, wherein the optical splitter is an optical 1×2 coupler or an optical circulator, a first port of which is connected to a respective end of an incoming optical waveguide guiding the optical transmission signal towards the fiber-optic connection, a second port of which is coupled to the optical waveguide guiding the optical transmission signal towards the fiber-optic connection and receiving the reflection signal, and a third port of which is connected to an optical monitoring waveguide guiding the detection signal towards the detection and evaluation means.

10. The monitoring device according to claim 8 or 9, wherein the optical transmission signal is an optical WDM signal and wherein the optical splitter is provided within the optical path connected to a WDM input port of an optical demultiplexing device in order to monitor one or more fiber-optic connections each provided within an optical path connected to one of a number of demultiplex output ports of the demultiplexing device.

11. The monitoring device according to claim 8 wherein the detection and evaluation means is adapted to convert the detection signal into an electrical detection signal which is evaluated by the detection and evaluation means, the electrical detection signal being acted upon by a low-pass filter function.

12. The monitoring device according to claim 8, wherein the detection and evaluation means comprises means for sampling the detection signal and evaluating the sampled values where at least one up-to-date sampled value or an up-to-date average value of more sampled values of the detection signal is compared to a previously sampled initial value or a previously taken initial average value of more sampled values, the "DETECT" signal being created if the up-to-date sampled value or the up-to-date average value differs by more than a predetermined threshold value from the previously sampled value or from the previously determined average of sampled values.

13. The monitoring device according to claim 12, wherein the detection and evaluation means comprises means for determining, during a steady state of the detection signal, the previously sampled initial value or the previously taken initial average value of sampled values.

14. The monitoring device according to claim 12, wherein the detection and evaluation means comprises means for continuously determining in predetermined time intervals a previously sampled initial value or a previously determined initial average of sampled values and continuously comparing these values to a respective subsequently sampled up-to-date value or a respective subsequently determined up-to-date average value of sampled values.

15. The monitoring device according to claim 8, wherein the detection and evaluation means comprises means for, during a steady state of the detection signal and before creating the "DETECT" signal, determining a sampled value or a previously determined average of sampled values of the detection signal as an initial steady state value and, after having created the "DETECT" signal, determining a further up-to-date sampled value or a further up-to-date average value during a subsequent steady state of the detection signal as an up-to-date steady state value, and creating a "PLUG-IN" signal if the up-to-date steady state value is lower than the initial steady state value or creating a "PLUG-OUT" signal if the up-to-date steady state value is higher than the initial steady state value.

16. The monitoring device according to claim 8, wherein the detection and evaluation means comprises means for receiving an information signal in case an admissible change or the status of the respective fiber-optic connection is effected at a predetermined time and wherein the detection and evaluation means comprises means for creating the "DETECT" signal based on the information signal.

17. The monitoring device according to claim 16, wherein the detection and evaluation means comprises means for creating no "DETECT" signal although the detection signal or a signal derived from the detection signal reveals an admissible change including the characteristic change in course over time, and wherein the detection and evaluation means comprises means for determining a new initial status of the detection signal after the admissible change.

18. The method according to claim 1, wherein the characteristic change is detected by comparing values of the detection signal or the signal derived therefrom to predetermined threshold values.

19. The method according to claim 1, wherein the characteristic change is detected by determining the slope of the detection signal or the signal derived therefrom and comparing the determined slope values to predetermined threshold slope values.

* * * * *